March 23, 1943.  J. R. REYBURN  2,314,600
VEHICLE BUMPER CONSTRUCTION
Filed May 27, 1941
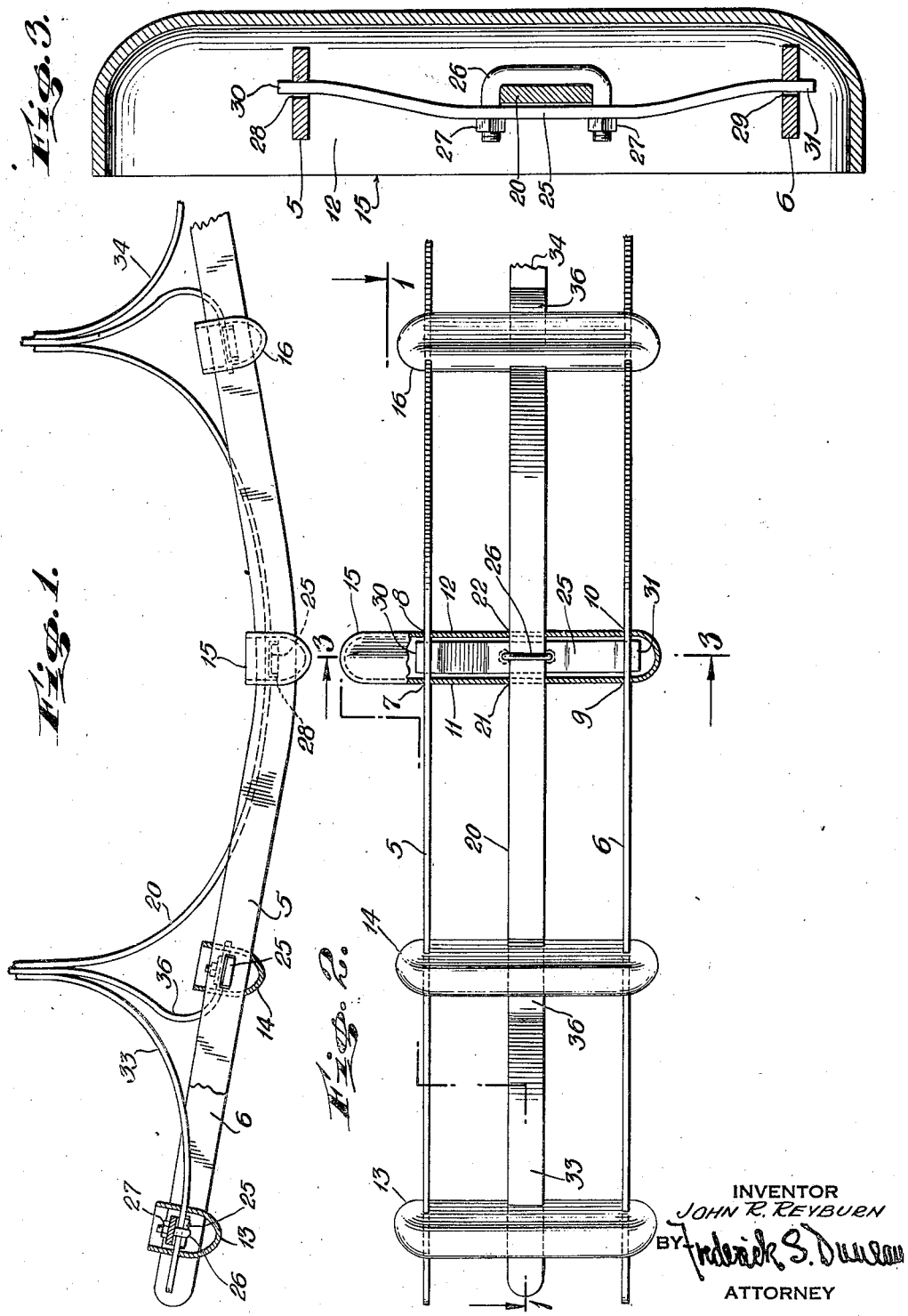
INVENTOR
JOHN R. REYBURN
BY
ATTORNEY Patented Mar. 23, 1943

2,314,600

UNITED STATES PATENT OFFICE 2,314,600

VEHICLE BUMPER CONSTRUCTION

John R. Reyburn, Fairfield, Conn., assignor to American Chain & Cable Company, Inc., a corporation of New York Application May 27, 1941, Serial No. 395,333

13 Claims. (Cl. 293—55)

This invention relates to improvements in vehicle bumper constructions.

Present day bumper constructions include provision for increasing the effective height of the bumper bar substantially throughout its length or locally at points in front of the center of the radiator grille guard and the wheel fenders. It is the practice to make the bumper bar substantially rigid and to locate it as close to these parts as permissible. In most of these earlier constructions the bumper bar was equipped with attachable vertical guards which projected a considerable distance above the upper edge of the bumper bar and in more recent constructions these guards are made integral with the bumper bar, and the bumper bars are supported on spring brackets of the type used with bumper bars of less height, with the result that impacts against the upper ends of the vertical guards tilt the vertical guards on the front bumper bar rearwardly into engagement with the radiator grille or the like. Bumper bars of relatively great vertical dimension also interfere with the free flow of air through the radiator grille and radiator.

Among the objects of this invention is the provision of a bumper bar construction which is of comparatively light weight considering the large area protected, which permits of the free flow of air through the radiator grille and radiator, in which the vertical guards are held against lateral movement and braced against tilting rearwardly and which comprises parts which may be made without extensive tooling and may be readily assembled.

Other objects of the invention will appear from the following description taken in connection with the drawing, in which—

Fig. 1 is a top plan view of a bumper construction embodying the principles of my invention and showing parts in section on the line 1—1 of Fig. 2;

Fig. 2 is a front elevational view of the bumper construction, showing the center vertical guard partly in vertical section; and Fig. 3 is a vertical section on the line 3—3 of Fig. 2.

The composite bumper bar construction of my invention comprises vertically spaced bumper bar elements 5 and 6 comprising bars preferably of rectangular stock with their longest cross sectional dimension extending horizontally, and extending through upper and lower pairs of rectangular apertures 7 and 8, 9 and 10 of slightly larger dimensions in rearwardly extending flanges 11 and 12 of vertical guards 13, 14, 15, 16 and another vertical guard, not disclosed, at the right hand end of the structure as viewed in the figures and corresponding to the vertical guard 13. These vertical guards may be of any desired length and as shown herein the center vertical guard 15 may be of greater length than the other vertical guards and project a greater distance above the upper bumper bar element 5 for the protection of the radiator grille. As now understood the various vertical guards and the bumper bar elements may be assembled by threading the bumper bar elements through the guards.

In prior constructions the single main bumper bar used was usually connected directly to supporting brackets and the vertical guards were clamped against the front face of the bumper bar. In the instant construction, the vertical guards are supported on brackets suitably secured to the frame of the vehicle. As disclosed in Fig. 1 the bracket construction comprises a center spring bracket 20 of shallow U-shape, the ends of which extend rearwardly to be secured against the sides of the side frame members of the vehicle and the center of the crown of which is threaded through slightly larger apertures 21 and 22 in the flanges 11 and 12 of the center vertical guard 15. In order to reduce and substantially prevent vibration of the bumper bar construction in a vertical plane this bracket 20 as well as the other brackets about to be described, is preferably male of rectangular stock with its longest cross sectional dimension extending vertically.

For the purpose of holding the center vertical guard 15 positioned on the bracket 20 and bumper bar elements 5 and 6 in the vertical guards, I provide a clamp construction including a rearwardly bowed spring plate 25 and a generally U-shaped bolt 26 which closely embraces the bracket 20 and has its legs projecting through holes in the spring plate 25 and the ends of the legs threaded, nuts 27 being provided for bending the spring plate, the U-bolt 26 being shaped as indicated to cause the same to bite in the corners of the bracket 20. The bumper bar elements 5 and 6 are provided with vertically alined apertures 28 and 29 to receive the ends 30 and 31 of the spring plate 25, these apertures being preferably made of slightly larger dimensions than the cross sectional dimensions of the ends of the plate 25 for ease in assembly. When the parts are assembled as shown in Fig. 3 the ends of the spring plate 25 will bear with sufficient force against the forward walls of the apertures 28 and 29 to prevent rattling between the bumper bar elements 5 and 6 and the bracket 20 and the vertical guard 15.

The end vertical guards of which one is shown at 13 are disclosed as of less length than the center vertical guard 15 but it is obvious that they may be made of any desired length. These vertical guards are supported on spring brackets 33 and 34 which are also made of rectangular stock and which have rear end portions to be secured against the sides of the side frame members of the vehicle and have forward portions extending laterally away from each other through apertures in the walls of the vertical guards 13 and secured therein by clamps similar in construction and operation to the clamp disclosed in Fig. 3. As shown in Figs. 1 and 2 the laterally extending ends of the brackets 33 may extend laterally beyond the vertical guards 13 as may also the ends of the bumper bars 5 and 6 and these vertical guards may be located substantially in alinement with the outer edges of the wheel fenders not disclosed or if desired they may be located in front of the centers of wheel fenders in which lamps are located.

The vertical guards 14 and 16 intermediate of the center vertical guard 15 and the end vertical guards 13 may be supported on spring brackets 36 which are also preferably made of rectangular stock and which have their rear ends interposed between the rear ends of the brackets 20 and 33 and 34 and secured to the sides of the side frame members of the vehicle and have their forward ends extending toward each other as indicated in Fig. 1 and passing through apertures in the vertical guards 14 and 16 and secured therein in the same manner in which the bracket 20 is secured to the vertical guard 15.

I have disclosed a vertical guard of boat shape but it is understood that while this is the preferred construction, the invention is not limited thereto; and I may omit if desired the lower end walls of the vertical guards but I prefer to provide the vertical guards with upper end walls to provide a construction with a finished appearance. The bumper bar elements 5 and 6 have been shown straight as viewed horizontally and curved or angular as viewed vertically and as continuous but it is obvious that they may be made of other desired shapes and either or both may be made sectional and comprise spaced or flexibly connected elements at the same or different levels. By making the bumper bar elements curved or angular much greater resistance is provided against rearwardly tilting for example, of the center vertical guard 15.

While I have disclosed but one embodiment of my invention which I now considered the preferred form, it is to be understood that I reserve the right to all such changes as fall within the principles of this invention and the scope of the appended claims.

I claim:

1. In a bumper construction, the combination of a plurality of vertical guards arranged in spaced relation transversely of a vehicle, spring brackets for supporting said guards on a vehicle, and a horizontally extending main bumper bar element supported on said guards, each of said guards comprising a rearwardly extending flange provided with an aperture through which said main bumper bar element extends.

2. In a bumper construction, the combination of a plurality of vertical guards arranged in spaced relation transversely of a vehicle, spring brackets for supporting said guards on a vehicle, a horizontally extending main bumper bar element supported on said guards, each of said guards comprising a rearwardly extending flange provided with an aperture through which said main bumper bar element extends, said main bumper bar element being provided with vertically extending apertures and means secured to said spring brackets and extending into said apertures.

3. In a bumper construction, the combination of a plurality of transversely spaced vertical guards each provided with a pair of rearwardly extending flanges and at least two pairs of alined apertures in said flanges, spring brackets for supporting said guards on a vehicle each extending through one of the pairs of apertures in the flanges of a vertical guard, and a main bumper bar element extending through each of the other pairs of apertures in the flanges of said vertical guards.

4. In a bumper construction, the combination of a plurality of transversely spaced vertical guards each provided with a pair of rearwardly extending flanges and at least two pairs of alined apertures in said flanges, spring brackets for supporting said guards on a vehicle each extending through one of the pairs of apertures in the flanges of a vertical guard, a main bumper bar element extending through each of the other pairs of apertures in the flanges of said vertical guards, said main bumper bar element being provided with vertically extending apertures within the bodies of said vertical guards, securing means each comprising an element located within a vertical guard and extending into the aperture in the main bumper bar element located within said vertical guard and means supporting said securing means on the spring bracket supporting said vertical guard.

5. In a bumper construction, the combination of a plurality of transversely spaced vertical guards each provided with a pair of rearwardly extending flanges and at least two pairs of alined apertures in said flanges, spring brackets for supporting said guards on a vehicle each extending through one of the pairs of apertures in the flanges of a vertical guard, a main bumper bar element extending through each of the other pairs of apertures in the flanges of said vertical guards, said main bumper bar element being provided with vertically extending apertures within the bodies of said vertical guards, clamping means each comprising an element located within a vertical guard and extending into the aperture in the main bumper bar element located within said vertical guard, and means for securing said clamping element to the spring bracket supporting said vertical guard, said clamping element comprising a spring plate of such shape and configuration as to bear against the forward edge of the aperture in the main bumper bar element when the plate is secured to the spring bracket.

6. In a bumper construction, the combination of a plurality of transversely spaced vertical guards each provided with rearwardly extending flanges provided adjacent their upper and lower ends with pairs of transversely alined rectangular apertures with their longest dimensions extending horizontally and provided also at an intermediate point with a pair of rectangular apertures with their longest dimension extending vertically, main bumper bar elements of rectangular cross section extending through said apertures adjacent the ends of the vertical guards, spring brackets of rectangular cross section extending through the apertures in the intermediate portion of the vertical guards, and means engaging said spring brackets and said main bumper bar elements for securing the parts in position.

7. In a bumper construction, the combination of a plurality of transversely spaced vertical guards each provided with rearwardly extending flanges provided adjacent their upper and lower ends with pairs of transversely alined rectangular apertures with their longest dimensions extending horizontally and provided also at an intermediate point with a pair of rectangular apertures with their longest dimension extending vertically, main bumper bar elements of rectangular cross section extending through said apertures adjacent the ends of the vertical guards, spring brackets of rectangular cross section extending through the apertures in the intermediate portion of the vertical guards, and a spring plate cooperating with each bracket and said bumper bar elements urging said bumper bar elements forwardly and said bracket rearwardly into frictional holding engagement with the apertures in the vertical guard.

8. In a bumper construction, the combination of a rigid impact receiving section comprising vertically spaced horizontally extending main bumper bar elements and a pair of transversely spaced vertical guards supporting one end of the bumper bar elements and a second pair of transversely spaced guards supporting the other end of the bumper bar elements, pairs of spring bar brackets for supporting said pairs of vertical guards, the brackets of each pair having their forward ends extending in opposite directions and means frictionally securing said vertical guards on said brackets.

9. In a bumper construction, the combination of a rigid impact receiving section comprising vertically spaced horizontally extending main bumper bar elements and pairs of transversely spaced vertical guards supporting said bumper bar elements adjacent their ends, of pairs of curved spring bar brackets for supporting said pairs of vertical guards, the brackets of each pair having their forward ends extending in opposite directions and away from each other and means securing said vertical guards on said brackets, the end portions of the outermost brackets and the ends of said bumper bar elements projecting beyond the vertical guards at the ends of the impact receiving section.

10. In a bumper bar construction, the combination of a rigid impact receiving section comprising vertically spaced horizontally extending main bumper bar elements, vertical guards comprising a guard located centrally of the impact receiving section and pairs of guards located adjacent the ends of the impact receiving section and provided with rearwardly extending flanges apertured to receive said main bumper bar elements, the flanges of the vertical guards also being provided with apertures to receive spring bar brackets, spring bar brackets comprising a U-shaped bracket for supporting the center vertical guard and curved brackets for supporting the remainder of said vertical guards, the brackets for supporting the vertical guards nearest the ends of the impact receiving section extending laterally away from each other and through the apertures in the vertical guards and the brackets for supporting the vertical guards adjacent to said latter vertical guards extending toward each other and through the apertures in said vertical guards, and means for securing said bumper bar elements and said brackets in the apertures of said vertical guards.

11. In a bumper construction, the combination of a plurality of vertical guards arranged in spaced relation transversely of a vehicle, each provided with at least two transversely extending apertures, spring brackets for supporting said guards on the vehicle, one bracket for each guard and extending through one of the apertures in the corresponding guard, a horizontally extending bumper bar extending through the other apertures in said guards and means for securing said spring brackets and said bumper bar within the apertures of said vertical guards.

12. In a bumper construction, the combination of a vertical guard provided with vertically spaced transversely extending apertures, a spring supporting bracket extending through one of said apertures, a horizontally extending guard element extending through the other of said apertures, and means for securing said bracket and guard element within said apertures.

13. In a bumper construction the combination of spring supporting brackets extending horizontally, transversely spaced vertical guards, said guards and brackets interengaging for supporting said guards upon said brackets against relative vertical movement and against relative horizontal movement in the direction of yielding of the spring supporting brackets, and vertically spaced horizontally extending main bumper bar elements lying above and below said brackets, said vertical guards and main bumper bar elements interengaging for supporting said main bumper bar elements against relative vertical movement and against relative horizontal movement in the direction of the yielding of the spring brackets.

JOHN R. REYBURN.